Patented Mar. 1, 1949

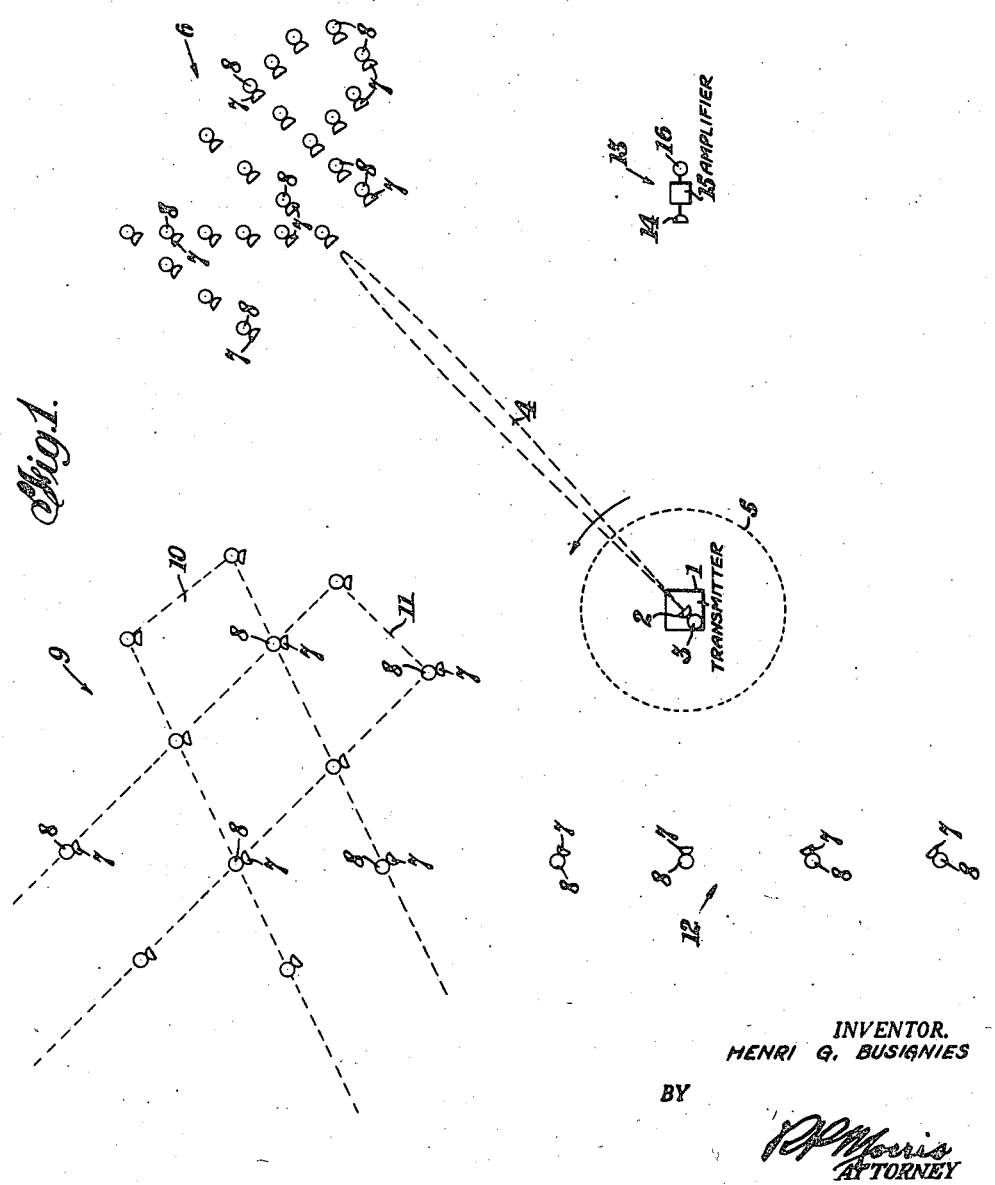

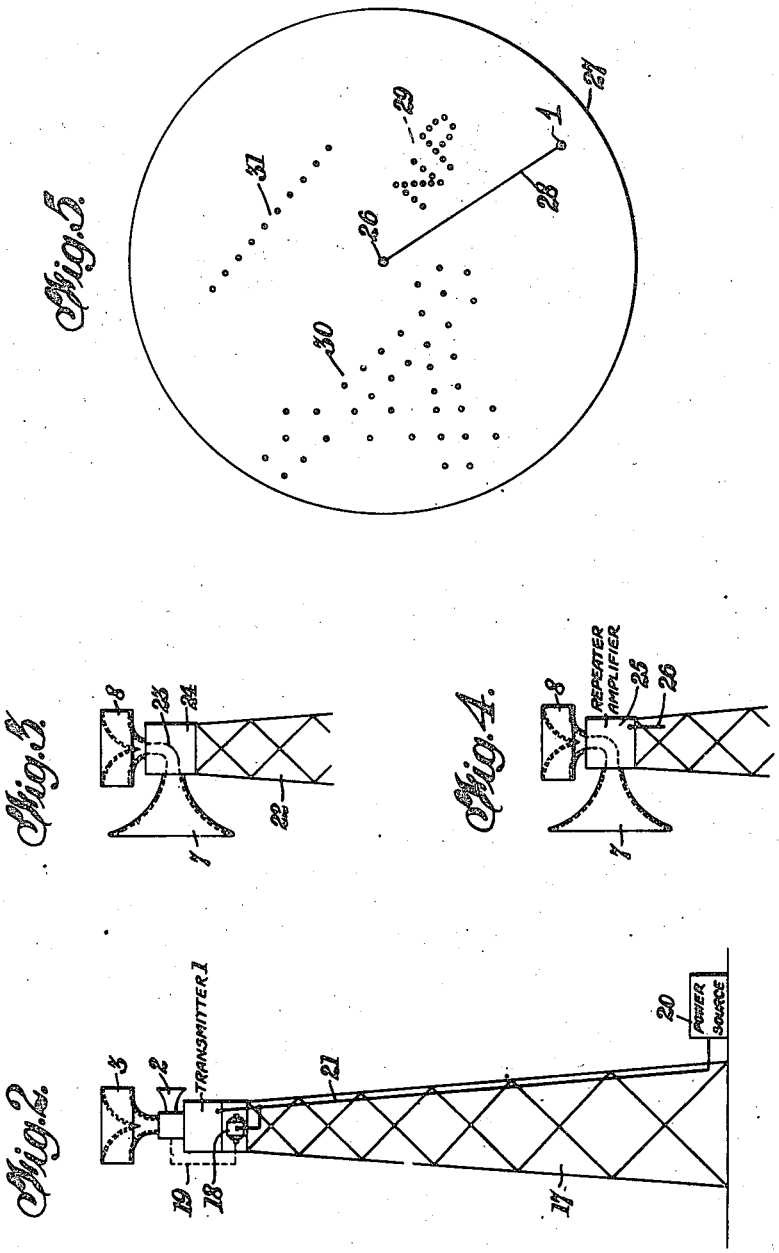

2,463,474

UNITED STATES PATENT OFFICE 2,463,474

AIR NAVIGATION SYSTEM

Henri G. Busignies, Forest Hills, N. Y., assignor to Federal Telephone and Radio Corporation, New York, N. Y., a corporation of Delaware Application March 5, 1945, Serial No. 581,072

15 Claims. (Cl. 343—101)

This invention relates to air navigation systems and more particularly to transmission systems for providing the transmission of energy in indicating patterns.

In a proposed system described in detail in my copending applications, entitled "Position finding systems," Serial No. 579,567, filed February 24, 1945, and entitled Direction finder system, Serial No 579,568, filed February 24, 1945, it is proposed to provide on a craft or other vehicle an indication of the position of reradiating objects without a transmitter being required on a craft. For the purpose of "illuminating" the reradiating objects, there is provided a radio transmitter or lighthouse preferably transmitting pulses to the various reradiating objects so that the position parameters may be readily determined on board the craft. With such systems it may be desirable to provide active or passive repeater systems which will serve to outline various runways, hangars and the like about an airport marker station along an air route or indications of the identity of an airport or obstacles that may be particularly dangerous for aircraft approaching a landing field.

It is an object of this invention to provide a system including a transmitter and a plurality of repeaters specifically designed for operation in connection with receiver equipment of the type described in the above-identified copending applications.

It is a further object of my invention to provide a radio transmitter which will radiate energy over a given area to a plurality of repeaters arranged to receive this energy and retransmit it upwardly.

It is another object of my invention to provide a plurality of repeaters directed toward a common transmitter arrangement for receiving energy from the transmitter and repeating in an upward direction, the repeaters being arranged to provide the predetermined pattern.

It is a still further object of my invention to provide a lighthouse transmitter for transmitting energy substantially horizontally in a sharply directed beam rotated at a predetermined speed and simultaneously to transmit energy from this transmitter in a broadly directed upward direction.

According to a feature of my invention, I provide a transmitter arrangement preferably a pulse transmitter which serves to transmit radio signal energy over a given area. In the field of the transmitter, I provide a plurality of active or passive repeaters having receiving antennas directed toward the transmitter and transmitting antennas directed to radiate the energy upwardly so that the energy from the separate repeaters will not serve to be further repeated by repeaters in its vicinity.

A better understanding of my invention and the objects and features thereof may be had by reference to the particular description of an embodiment thereof made with reference to the accompanying drawings, in which:

Fig. 1 is an illustration in plan of a transmitter and a plurality of radio repeaters arranged in accordance with the principles of my invention;

Fig. 2 is a diagram of a typical radio transmitter which may serve as a lighthouse radio transmitter in the system shown in Fig. 1.

Fig. 3 is a typical passive repeater arrangement for use in accordance with the principles of my invention;

Fig. 4 is a diagram of an active repeater unit for use in accordance with my invention; and Fig. 5 is an illustration of a typical pattern which might be produced on board an aircraft from an indication transmission system in accordance with my invention.

Turning first to Fig. 1, a radio transmitter is shown at 1 provided with a sharply directive transmitting antenna 2 and an upwardly directed transmitting antenna 3. The antenna 2 produces a sharply directive beam as indicated at 4 and is preferably rotated at a predetermined speed so as to sweep beam 4 around a complete circle. It should be understood that if desired the beam may be swept through any angle other than a complete circle. Antenna 3 preferably produces an upwardly directive pattern substantially omni-directional in the azimuthal plane as indicated at 5. At 6 is provided a plurality of repeaters outlining the letters NP which may be a designation of the particular airport. Each of these repeaters includes a receiving antenna 7 and a transmitting antenna 8, antenna 7 preferably being relatively sharply directive toward transmitter 1 and antenna 8 being directed to radiate the repeated energy upwardly. These repeaters are preferably arranged at substantially the same height above the ground and the patterns are so upwardly directed that energy from one repeater will not be received for repetition at the other repeaters. At 9 is shown a fragmentary portion of the landing strip arrangement showing the intersection of two landing strips 10 and 11. These landing strips are outlined by repeaters similar to those shown at 6 each also consisting of a receiving antenna 7 and a transmitting antenna 8. On another side of the airport are provided a third group of repeaters indicated generally at 12 which may serve to outline the position of hangars, high trees or other obstacles, for example, that must be avoided by an aircraft in making a landing. These repeaters also consist of similarly directed horizontal antennas 7 and vertical radiators 8.

For the purpose of position finding it may be desirable to provide a special active repeater which may repeat the energy from transmitter 1 at the same or at a different frequency. This may be desirable in many cases in order that an aircraft may locate its position relative to the airport by triangulation. For this purpose, there may be provided a third repeater arrangement 13 including a directive receiving antenna 14 aligned to receive energy from transmitter 1, an amplifier 15 for amplifying the received energy and a transmitting antenna 16 for transmitting the received amplified energy vertically upwardly. It should be understood that antenna 16 may transmit the energy in a much broader angle than the other repeaters if repeater 13 is transmitting at a different radio frequency since this energy would then interfere with the energy repeated in the other systems.

It will be apparent from the disclosure of Fig. 1 that energy from transmitter 1 will serve successfully to illuminate the various repeaters in groups 6, 9, 12 and 13 so that energy from these repeaters will be successively transmitted upwardly for reception on an aircraft in the vicinity of the airport. These repeated signals will be considerably stronger than signals radiated from miscellaneous objects in the field of the transmitter since the repeaters are all designed to reradiate the energy at higher level. It is therefore evident that an aircraft utilizing this system need not have a receiver which is as highly sensitive as would be required were reradiation alone relied upon.

In Fig. 2 is shown a typical transmitter arrangement corresponding to the transmitter 1 of Fig. 1. A tower 17 is provided upon which is mounted the transmitter 1, horizontally sharply directive transmitting antenna 2 and the upwardly directed transmitting antenna 3. A motor 18 coupled to antenna 2 mechanically as indicated by broken line 19 serves continuously to rotate antenna 2 at a predetermined speed. Energy for the transmitter and for driving the motor may be furnished by a power supply 20 arranged at ground level and connected by a cable 21 with transmitter 1 and with motor 18. Transmitting antennas 2 and 3 are shown as horn type directive antennas. It should be understood, however, that any type of directive antenna suitable for the purpose may be used.

In Fig. 3 is illustrated a typical passive radio repeater of the type for use in the system such as shown in Fig. 1. In this arrangement a mast 22 serves to support receiving antenna 7 and transmitting antenna 8. Receiving antenna 7 is preferably made sharply larger than transmitting antenna 2 so as to receive a large proportion of the energy. Likewise, the antenna is preferably shaped in the form of an exponential horn to provide substantially impedance matching for the coupling of antenna 7 with antenna 8. A coupling line 23 serves as the energy transfer means between receiving antenna 7 and transmitting antenna 8. The entire structure may be mounted on a support 24 on the top of tower 22.

The active repeater shown in Fig. 4 is substantially similar to the passive repeater of Fig. 3 being provided with the similar receiving antenna 7 and retransmitting antenna 8. However, intermediate transmitters 7 and 8 are provided a repeater amplifier 25 which is preferably coupled in impedance matched relation with antennas 7 and 8. A power supply lead 26 may serve to furnish the necessary power to repeating amplifier 25.

In Fig. 5 is illustrated a typical indication which might be provided on an aircraft through the medium of signals transmitted in a system in accordance with my invention. In this figure, the aircraft is indicated at 26 at the center of the indicator screen 27 and transmitter 1 is indicated in the lower right hand corner and interconnected with 26 by line 28 which may be produced on the indicator as described in my aforementioned copending application, Serial No. 579,568. Briefly these indications may be provided by utilizing a system of direction finders on the aircraft whereby the directions of the transmitter and the re-radiators from the aircraft can be derived. By noting when the transmitter beam swings past the aircraft and assuming that the transmitter beam rotates at a known fairly constant speed, it is a simple matter to maintain the sweep rotation of the aircraft indicator in synchronism with the transmitter beam rotation by means of a start-stop clutch arrangement. By utilizing this information, the desired indication may be obtained. The pattern of the repeaters indicating the identity of the airport is shown at 29 on the drawing and clearly outlines the letters NP of Fig. 1. The three landing strips at the airport are shown clearly outlined at 30 on the indicator and at 31 is shown a row of spots which may indicate an obstacle to be avoided by craft 26 while in the vicinity of the airport.

While I have shown only a single typical example of an installation in accordance with my invention, it will be clear to those skilled in the art that many modifications of this system may be provided as desired without departure from the scope of my invention. For example, if a triangulation method is to be used transmitter 1 may not necessarily be sharply directive but may transmit signals over a relatively wide arc or an entire circle. In this case, however, the transmitter must utilize pulse energy in order properly to work. Furthermore, the upwardly directed antenna may be omitted at the transmitter if an indication of this lighthouse transmitter position is not desired on the craft. Moreover, many different types of repeaters may be provided so long as they meet the requirements of transmitting energy which can be received on the craft to indicate the discreet points at which the repeaters are located. It should, therefore, be clearly understood that the specific description and apparatus as outlined herein is not to be considered as a limitation on my invention as set forth in the objects thereof and in the accompanying claims.

I claim:

1. An indication transmission system comprising a transmitter located on the ground for transmitting a radio signal energy, and a plurality of reradiating means arranged in a predetermined pattern in the field of and relatively fixed with respect to said transmitter, and means at each reradiating means for receiving energy from said transmitter and for retransmitting said received energy upwardly to an aircraft.

2. A system according to claim 1 wherein said reradiating means each comprise a directive receiving antenna substantially aligned with said transmitter.

3. A system according to claim 1 wherein said transmitting means comprises a directive antenna, and means for moving said directive antenna over a predetermined angle, and said reradiating means each comprise directive receiving antennas substantially aligned with said transmitter.

4. A method of providing indicating transmissions comprising transmitting from a fixed point on the ground a radio signal, receiving energy from said transmitter at a plurality of relatively fixed reradiating points arranged in a predetermined pattern, and retransmitting said received energy upwardly to a mobile craft.

5. An indication transmission system comprising a relatively fixed transmitter located on the ground for transmitting a radio signal energy in a substantially horizontal direction, and a plurality of relatively fixed reradiating means arranged in a predetermined pattern in the field of said transmitter, and directive means at each reradiating means substantially aligned with said transmitter for receiving energy from said transmitter and for retransmitting said received energy upwardly to an aircraft.

6. A system according to claim 5 wherein said transmitting means comprises a directive antenna, and means for moving said directive antenna over a predetermined angular sweep.

7. A transmission system comprising a radio transmitter located on the ground, a directive radiator means for said transmitter, means for rotating said radiator means at a predetermined speed, a plurality of repeater means for receiving the directed beam from the transmitter, and retransmitting in an upwardly directed beam to an aircraft.

8. A transmission system comprising a radio transmitter located on the ground, a horizontally directed radio means for said transmitter, means for rotating said radiator means at a predetermined speed, and a plurality of repeater means each having a directive antenna aligned with said radiator means for receiving the horizontally directed beam from the transmitter, and vertically directed antenna for retransmitting the received energy in an upwardly directed beam to aircrafts.

9. A transmission system comprising a radio transmitter located on the ground, a narrow beam horizontal directive radiator means for said transmitter, means for rotating said radiator means at a predetermined speed, a plurality of repeater means for receiving the horizontally directed beam from the transmitter, and retransmitting the received energy in an upwardly directed relatively broad beam to aircrafts.

10. In a navigation guiding transmission system for producing a radiation in a predetermined pattern in response to signal energy from a radio transmitter located on the ground, a plurality of radio repeater means mounted in predetermined positions in the field of said transmitter to outline predetermined patterns for aircrafts, each of said repeaters comprising a horizontally arranged receiving antenna, oriented for reception on a line to said transmitter, a vertically directed radiator, and energy transfer connections between said repeater receiving and transmitting antennas.

11. A navigation guiding transmission system comprising a radio transmitter, a radiator coupled to said transmitter, and a plurality of radio repeater means mounted in predetermined positions in the field of said transmitter to outline predetermined patterns, each of said repeaters comprising a sharply directive horizontally arranged receiving antenna, oriented for reception on a line to said transmitter, a small vertically directed radiator omnidirectional in azimuth, and energy transfer connections between said repeater receiving and transmitting antennas.

12. A navigation guiding transmission system comprising a radio transmitter, a sharply directive radiator coupled to said transmitter and directed in a substantially horizontal direction, means for rotating said sharply directive radiator at a predetermined speed of rotation to transmit the beam radiated therefrom in successively different azimuthal directions of radio repeater means mounted in predetermined positions in the field of said transmitter to outline predetermined patterns, each of said repeaters comprising a sharply directive horizontally arranged receiving antenna, oriented for reception on a line to said transmitter, a small vertically directed radiator omnidirectional in azimuth, and energy transfer connections between said repeater receiving and transmitting antennas.

13. A navigation guiding transmission system comprising a radio pulse transmitter, a sharply directive radiator coupled to said transmitter and directed in a substantially horizontal direction, means for rotating said sharply directive radiator at a predetermined speed of rotation to transmit the beam radiated therefrom in successively different azimuthal directions, and a plurality of radio repeater means mounted in predetermined positions in the field of said transmitter to outline predetermined patterns, each of said repeaters comprising a sharply directive horizontally arranged receiving antenna, oriented for reception on a line to said transmitter, a small vertically directed radiator omnidirectional in azimuth, and impedance matching connections between said repeater receiving and transmitting antennas.

14. A navigation guiding transmission system comprising a radio pulse transmitter, a sharply directive radiator coupled to said transmitter and directed in a substantially horizontal direction, means for rotating said sharply directive radiator at a predetermined speed of rotation to transmit the beam radiated therefrom in successively different azimuthal directions, and a plurality of radio repeaters means mounted in predetermined positions in the field of said transmitter to outline predetermined patterns, each of said repeaters comprising a sharply directive horizontally arranged receiving antenna, oriented for reception on a line to said transmitter, a small vertically directed radiator omnidirectional in azimuth, and amplifier means connected between said repeater receiving and transmitting antennas.

15. A navigation guiding transmission system comprising a radio pulse transmitter, a sharply directive radiator coupled to said transmitter and directed in a substantially horizontal direction, means for rotating said sharply directive radiator at a predetermined speed of rotation to transmit the beam radiated therefrom in successively different azimuthal directions, a vertically directed antenna, omnidirectional in azimuth coupled to said transmitter for transmitting a broad vertically directed radiation pattern, and a plurality of passive radio repeater means mounted in predetermined positions in the field of said transmitter to outline predetermined patterns, each of said repeaters comprising a sharply directive horizontally arranged receiving antenna, oriented for reception on a line to said transmitter, a small vertically directed radiator omnidirectional in azimuth and impedance matching connections between said repeater receiving and transmitting antennas.

HENRI G. BUSIGNIES.

REFERENCES CITED

The following references are of record in the file of this patent:

UNITED STATES PATENTS

| Number | Name | Date |
| --- | --- | --- |
| 1,885,023 | Dieckmann | Oct. 25, 1932 |
| 1,939,345 | Gerth et al. | Dec. 12, 1933 |
| 2,212,110 | Beuermann | Aug. 20, 1940 |
| 2,226,860 | Grieg | Dec. 31, 1940 |
| 2,279,246 | Podliasky et al. | Apr. 7, 1942 |
| 2,396,112 | Morgan | Mar. 5, 1946 |